F. DE COTIS.
WRENCH.
APPLICATION FILED NOV. 6, 1915.
1,192,280. Patented July 25, 1916.
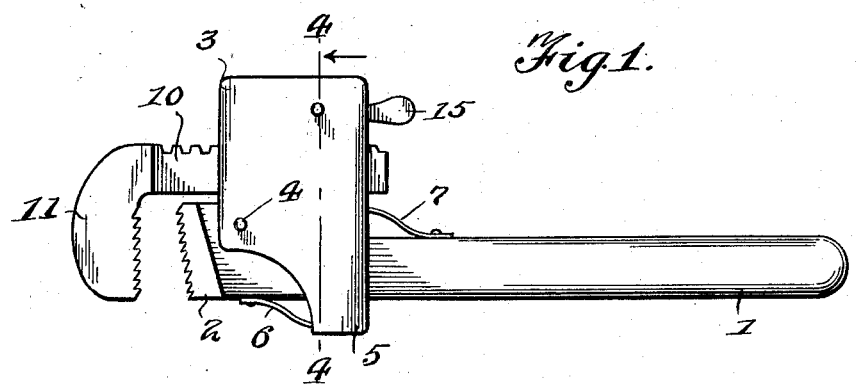
Witnesses
Inventor
F. De Cotis.
By Victor J. Evans
Attorney

UNITED STATES PATENT OFFICE.

FRANK DE COTIS, OF NEW YORK, N. Y.

WRENCH.

1,192,280.                    Specification of Letters Patent.        Patented July 25, 1916.

Application filed November 6, 1915. Serial No. 60,109.

*To all whom it may concern:*

Be it known that I, FRANK DE COTIS, a citizen of the United States, residing at New York, in the county of New York and State of New York, have invented new and useful Improvements in Wrenches, of which the following is a specification.

The present invention relates to improvements in pipe wrenches.

The object of the invention is to provide a pipe wrench which will afford a ready and quick adjustment for attachment onto pipes and which will securely lock itself in adjusted position.

With the above and other objects in view, the improvement resides in the construction, combination and arrangement of parts set forth in the following specification and falling within the scope of the appended claim.

In the drawing: Figure 1 is a side view of a wrench constructed in accordance with the present invention, Fig. 2 is a front view of the same, Fig. 3 is a sectional view approximately on the line 3—3 of Fig. 2, and Fig. 4 is a transverse sectional view approximately on the line 4—4 of Fig. 1.

Referring now to the drawings in detail, 1 designates a lever or handle having one of its ends formed with a jaw 2.

The numeral 3 designates a swinging member or housing which is pivotally secured to the handle 1 at the rear of the jaw 2, as at 4, the said housing including a loop portion 5, and the numeral 6 designates a flat spring which is secured at the outer edge of the handle 1 directly at the rear of the jaw 2 which exerts a tension against the loop 5. The numeral 7 designates a similar spring which is secured to the inner edge of the handle 1 and which has its free end entering the housing 3 and contacting with the longitudinal partition 8 provided in the said housing. The springs 6 and 7 exert a pressure in opposite directions and this pressure it will be noted is remote from the pivot 4 so that the housing 3 will be normally sustained by the springs at a substantially right angle to the longitudinal plane of the handle 1. The housing 3 is provided with a second longitudinally extending partition 9 dividing the housing into three compartments, the one through which the handle passes being indicated by the numeral 10'. The middle compartment receives the toothed shank 10 of a movable jaw 11, and the remaining compartment has pivotally secured therein, as at 12, the laterally extending widened portion 13 of an elongated pawl 14. The handle 15 of the pawl passes through the rear end of the compartment so that the same may be readily grasped by the operator, and the toothed end 16 is normally forced through an opening 9' in the partition 9 and into engagement between two of the teeth of the shank 10 by a helical spring 17.

Having thus described the invention, what I claim is:

In a wrench of the class described, a handle provided with a jaw, a movable jaw having a toothed shank, a housing divided into three longitudinally arranged compartments, the handle at the jaw end thereof being pivotally secured in one of the end compartments, the shank of the movable jaw being arranged in the intermediate compartment, a locking dog pivotally secured in the second end compartment and having a tail portion extending through the said compartment, said dog having its end opposite its tail formed with a single tooth which is arranged adjacent an opening in the partition dividing said end from the intermediate compartment, and a spring member contacting with the outer wall of the end compartment and engaging with the dog opposite the tooth thereof to force the tooth of the dog into the intermediate compartment and into engagement between two of the teeth of the shank of the movable jaw.

In testimony whereof I affix my signature in presence of two witnesses.

FRANK DE COTIS.

Witnesses:
  THOMAS J. DEHEE,
  THOMAS J. CRAVEN.

Copies of this patent may be obtained for five cents each, by addressing the "Commissioner of Patents, Washington, D. C."